(12) United States Patent
Yamagishi

(10) Patent No.: US 12,407,191 B2
(45) Date of Patent: Sep. 2, 2025

(54) CLOSED-SPACE SENSOR SYSTEM AND METHOD FOR OPERATING CLOSED-SPACE SENSOR SYSTEM

(71) Applicant: Azbil Corporation, Tokyo (JP)

(72) Inventor: Yoshiaki Yamagishi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 252 days.

(21) Appl. No.: 18/025,438

(22) PCT Filed: Sep. 15, 2021

(86) PCT No.: PCT/JP2021/033829
§ 371 (c)(1),
(2) Date: Mar. 9, 2023

(87) PCT Pub. No.: WO2022/075020
PCT Pub. Date: Apr. 14, 2022

(65) Prior Publication Data
US 2023/0334978 A1     Oct. 19, 2023

(30) Foreign Application Priority Data

Oct. 6, 2020   (JP) ................................. 2020-168858

(51) Int. Cl.
*H02J 50/20* (2016.01)
*H02J 50/40* (2016.01)

(52) U.S. Cl.
CPC ............. *H02J 50/20* (2016.02); *H02J 50/40* (2016.02)

(58) Field of Classification Search
CPC .................................. H02J 50/20; H02J 50/40
See application file for complete search history.

(56) References Cited

U.S. PATENT DOCUMENTS 9,909,916 B2 *   3/2018   Zhang ..................... G01F 23/26
2010/0253156 A1 * 10/2010   Iott ......................... G01D 21/00
307/149

(Continued)

FOREIGN PATENT DOCUMENTS

JP    2014-081860 A    5/2014
JP    2019-088128 A    6/2019

(Continued)

OTHER PUBLICATIONS

International Search Report received for PCT Patent Application No. PCT/JP2021/033829, mailed on Nov. 9, 2021, 4 pages (2 pages of English translation of International Search Report, and 2 pages of original International Search Report).

(Continued)

*Primary Examiner* — Rexford N Barnie
*Assistant Examiner* — Joseph N Inge

(57) ABSTRACT

A closed-space sensor system that enables stable operation in a closed space is provided.
The closed-space sensor system includes: a power transmitter of an electromagnetic wave irradiator emitting an electromagnetic wave; and a plurality of sensors, each of which includes an antenna and is driven by converting the electromagnetic wave received via the antenna into electric power. Each of the plurality of sensors may further include a power storage unit, and each of the plurality of sensors may start to be driven when a power storage amount in the power storage unit reaches a drive start threshold value that is common to the plurality of sensors. The power transmitter of the electromagnetic wave irradiator and the plurality of sensors may be arranged in a closed space.

11 Claims, 17 Drawing Sheets

(56) References Cited

U.S. PATENT DOCUMENTS

| | | | | |
|---|---|---|---|---|
| 2012/0158321 A1* | 6/2012 | Bommer | ............... | G01F 23/806 |
| | | | | 702/55 |
| 2012/0223595 A1* | 9/2012 | Oodachi | ............... | H02J 50/402 |
| | | | | 307/104 |
| 2014/0008989 A1* | 1/2014 | Bommer | ................ | H02J 50/20 |
| | | | | 307/104 |
| 2015/0257203 A1* | 9/2015 | Okada | .................... | G08C 15/00 |
| | | | | 370/338 |
| 2016/0322852 A1* | 11/2016 | Yeh | .......................... | H04B 5/79 |
| 2017/0085126 A1 | 3/2017 | Leabman | | |
| 2019/0363588 A1 | 11/2019 | Daetwyler et al. | | |
| 2020/0185973 A1 | 6/2020 | Tani | | |
| 2020/0201369 A1* | 6/2020 | Brower | ................... | H04W 4/70 |
| 2020/0404597 A1* | 12/2020 | Davlantes | ............... | H02J 50/90 |

FOREIGN PATENT DOCUMENTS

| | | |
|---|---|---|
| WO | 2016/123062 A1 | 8/2016 |
| WO | 2019/230355 A1 | 12/2019 |
| WO | 2020/075395 A1 | 4/2020 |

OTHER PUBLICATIONS

Written Opinion of the International Searching Authority issued for PCT Patent Application No. PCT/JP2021/033829, mailed on Nov. 9, 2021, 8 pages (4 pages of English translation of Written Opinion, and 4 pages of original Written Opinion).

European Patent Office, "Extended European Search Report", issued in European Patent Application 21877323.2, which is a counterpart to U.S. Appl. No. 18/025,438, on May 16, 2025, 10 pages.

\* cited by examiner

| | f1 | f3 | f10 | f1 | f3 | f10 |
|---|---|---|---|---|---|---|
| Sensor 30A | O | × | × | O | × | × |
| Sensor 30B | O | × | × | O | × | × |
| Sensor 30C | × | O | × | × | O | × |
| Sensor 30D | × | × | O | × | × | O |
| Sensor 30E | × | × | × | × | × | × |

Fig. 5(a) Power Transmission Sequence In Normal Time

| | f1 | f3 | f10 | f2 | f3 | f10 | f4 |
|---|---|---|---|---|---|---|---|
| Sensor 30A | O | × | × | × | × | × | × |
| Sensor 30B | O | × | × | × | × | × | × |
| Sensor 30C | × | O | × | × | O | × | × |
| Sensor 30D | × | × | O | O | × | O | × |
| Sensor 30E | × | × | × | O | × | × | × |

Fig. 5(b) Power Transmission Sequence During Resetting Confirmation

| | f1 | f3 | f2 | f3 | f2 |
|---|---|---|---|---|---|
| Sensor 30A | O | × | × | × | × |
| Sensor 30B | O | × | × | × | × |
| Sensor 30C | × | O | × | O | × |
| Sensor 30D | × | × | O | × | O |
| Sensor 30E | × | × | O | × | O |

Fig. 5(c) Power Transmission Sequence After Resetting

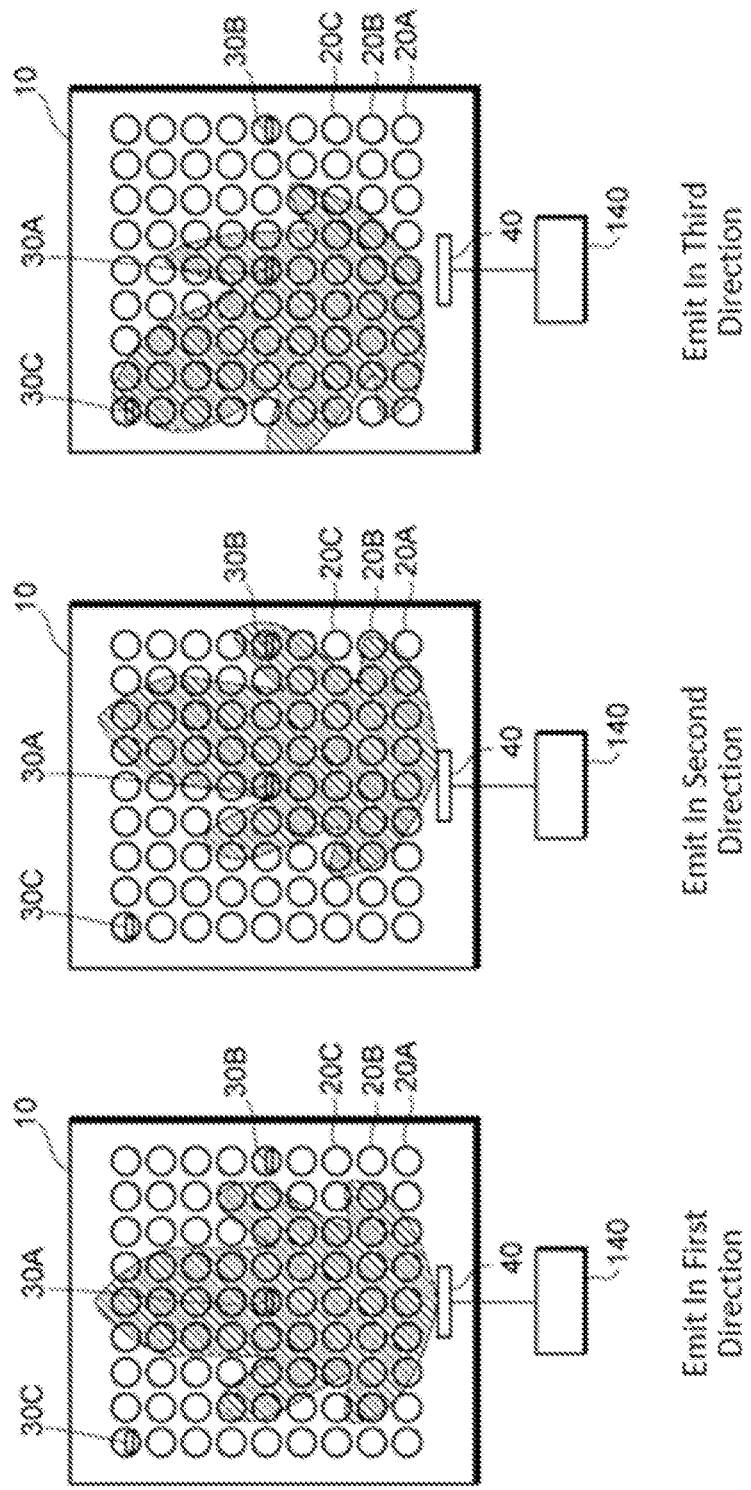

CLOSED-SPACE SENSOR SYSTEM AND METHOD FOR OPERATING CLOSED-SPACE SENSOR SYSTEM

CROSS REFERENCE TO RELATED APPLICATIONS

This patent application is a U.S. national stage application under 35 U.S.C. § 371 of International Patent Application No. PCT/JP2021/033829 filed on Sep. 15, 2021, which claims the benefit of foreign priority to Japanese Patent Application No. JP 2020-168858 filed on Oct. 6, 2020. The International Application was published in Japanese on Apr. 14, 2022, as International Publication No. WO 2022/075020 A1 under PCT Article 21(2).

TECHNICAL FIELD

The present invention relates to a closed-space sensor system and a method for operating a closed-space sensor system.

BACKGROUND ART

In closed spaces such as a room, a depository, a cell, a tank, and a furnace, there is a case where a plurality of sensors are arranged and for purposes of quality control and traceability, each of the plurality of sensors measures distributions of environmental conditions such as temperature and humidity in the closed space, and monitors a presence or absence and movement of each of a plurality of items that are arranged in the closed space (for example, see PTL 1 and PTL 2).

Conventionally, a sensor is powered by wire and exchanges data by wire. However, in recent years, a wireless sensor that exchanges data wirelessly has become widespread. A wireless sensor has advantages in that the wireless sensor does not require wiring work, can be arranged at a position where wiring is physically difficult, does not cause a wiring defect that can occur due to contact between a wire and an object, or the like. The advantage of eliminating the need for complicated wiring, especially when arrangement of a plurality of sensors is required, is regarded as significant.

Wireless sensors include sensors that are powered by wire and sensors that are powered wirelessly. A wired power supply cannot take advantage of the wireless sensor that does not require wiring. Therefore, a wireless sensor that is also powered wirelessly has attracted attention.

CITATION LIST

Patent Literature

PTL 1: WO 2016/123062
PTL 2: JP-A-2019-88128

SUMMARY OF THE INVENTION

Problems that the Invention is to Solve

According to knowledge of the present inventor, there is a case where, when a plurality of wireless sensors are driven simultaneously, communication quality is degraded and operation becomes unstable. In view of this, the invention has a purpose of providing a closed-space sensor system and a method for operating a closed-space sensor system, each of which enables stable operation in a closed space.

Means for Solving the Problems

An aspect of the invention provides a closed-space sensor system that includes: a power transmitter of an electromagnetic wave irradiator that emits an electromagnetic wave; and a plurality of sensors, each of which includes an antenna, converts the electromagnetic wave received via the antenna into electric power, and is thereby driven. Each of the plurality of sensors includes a power storage unit. Each of the plurality of sensors starts to be driven when a power storage amount in the power storage unit reaches a drive start threshold value that is common to the plurality of sensors. The power transmitter of the electromagnetic wave irradiator and the plurality of sensors are arranged in a closed space.

In the closed-space sensor system described above, reception sensitivities of at least some of the plurality of sensors may differ in the closed space.

In the closed-space sensor system described above, peaks of the reception sensitivities of at least some of the plurality of sensors may be able to be located outside a power transmission frequency range of the electromagnetic wave where the power transmitter of the electromagnetic wave irradiator can emit the electromagnetic wave.

In the closed-space sensor system described above, when the power storage amount in the power storage unit reaches the drive start threshold value that is common to the plurality of sensors, each of the plurality of sensors may start to be driven and transmit a sensing signal wirelessly.

In the closed-space sensor system described above, measurement cycles of the plurality of sensors may be the same.

In the closed-space sensor system described above, each of the plurality of sensors may include: a transmission unit that transmits the sensing signal via the antenna in a transmission cycle; and a random number assignment unit that generates a random number and assigns the random number to the transmission cycle. The antenna that transmits the sensing signal may be the same as or may differ from the antenna that receives the electromagnetic wave to be converted into the electric power.

In the closed-space sensor system described above, each of the plurality of sensors may further include the transmission unit that transmits the sensing signal in at least one of a plurality of signal transmission frequency channels via the antenna. The antenna that transmits the sensing signal may be the same as or may differ from the antenna that receives the electromagnetic wave to be converted into the electric power.

The closed-space sensor system described above may further include a plurality of sensing signal receivers for receiving the sensing signal.

In the closed-space sensor system described above, the power transmitter of the electromagnetic wave irradiator may emit the electromagnetic wave in at least one of a plurality of power transmission frequency channels within the power transmission frequency range.

In the closed-space sensor system described above, in a relationship of reception sensitivity of the antenna with a power transmission frequency, an interval between the power transmission frequency channels may be narrower than an interval between two power transmission frequencies, each of which gives the reception sensitivity of a sensitivity threshold value with which each of the plurality of sensors can be driven.

In the closed-space sensor system described above, the electromagnetic wave irradiator may set a combination of the plurality of power transmission frequency channels in which a predetermined number of sensors among the plurality of sensors can be driven.

In the closed-space sensor system described above, the power transmitter of the electromagnetic wave irradiator may be configured to emit the electromagnetic wave from a plurality of positions in the closed space.

In the closed-space sensor system described above, the electromagnetic wave may be a microwave.

An aspect of the invention provides a method for operating a closed-space sensor system, the method including: emitting an electromagnetic wave from a power transmitter of an electromagnetic wave irradiator; and driving each of a plurality of sensors by converting the electromagnetic wave, which is received via an antenna, into electric power. Each of the plurality of sensors includes a power storage unit. Each of the plurality of sensors starts to be driven when a power storage amount in the power storage unit reaches a drive start threshold value that is common to the plurality of sensors. The power transmitter of the electromagnetic wave irradiator and the plurality of sensors are arranged in a closed space.

In the method for operating a closed-space sensor system described above, reception sensitivities of at least some of the plurality of sensors may differ in the closed space.

In the method for operating a closed-space sensor system described above, peaks of the reception sensitivities of at least some of the plurality of sensors may be able to be located outside a power transmission frequency range of the electromagnetic wave where the power transmitter of the electromagnetic wave irradiator can emit the electromagnetic wave.

In the method for operating a closed-space sensor system described above, when the power storage amount in the power storage unit reaches the drive start threshold value that is common to the plurality of sensors, each of the plurality of sensors may start to be driven and transmit a sensing signal wirelessly.

In the method for operating a closed-space sensor system described above, measurement cycles of the plurality of sensors may be the same.

In the method for operating a closed-space sensor system described above, each of the plurality of sensors may transmit the sensing signal in a transmission cycle via the antenna, may generate a random number, and may assign the random number to the transmission cycle.

In the method for operating a closed-space sensor system described above, each of the plurality of sensors may transmit the sensing signal in at least one of a plurality of signal transmission frequency channels via the antenna.

In the method for operating a closed-space sensor system described above, the power transmitter of the electromagnetic wave irradiator may emit the electromagnetic wave in at least one of a plurality of power transmission frequency channels within the power transmission frequency range.

In the method for operating a closed-space sensor system described above, in a relationship of the reception sensitivity of the antenna to the power transmission frequency, an interval between the power transmission frequency channels may be narrower than an interval between two power transmission frequencies, each of which gives the reception sensitivity of a sensitivity threshold value with which each of the plurality of sensors can be driven.

In the method for operating a closed-space sensor system described above, the electromagnetic wave irradiator may set a combination of the plurality of power transmission frequency channels in which a predetermined number of sensors among the plurality of sensors can be driven.

In the method for operating a closed-space sensor system described above, the power transmitter of the electromagnetic wave irradiator may be configured to emit the electromagnetic wave from a plurality of positions in the closed space.

In the method for operating a closed-space sensor system described above, the electromagnetic wave may be a microwave.

Effects of the Invention

The invention can provide a closed-space sensor system and a method for operating a closed-space sensor system, each of which enables stable operation in the closed space.

BRIEF DESCRIPTION OF THE DRAWINGS

FIG. 5 includes tables, each of which illustrates the exemplary relationship between the power transmission frequency channels of the electromagnetic wave and the drivable sensors according to the first embodiment.

FIG. 18 is a schematic view illustrating a sensor system according to a fifth embodiment.

MODE FOR CARRYING OUT THE INVENTION

Figure 1:
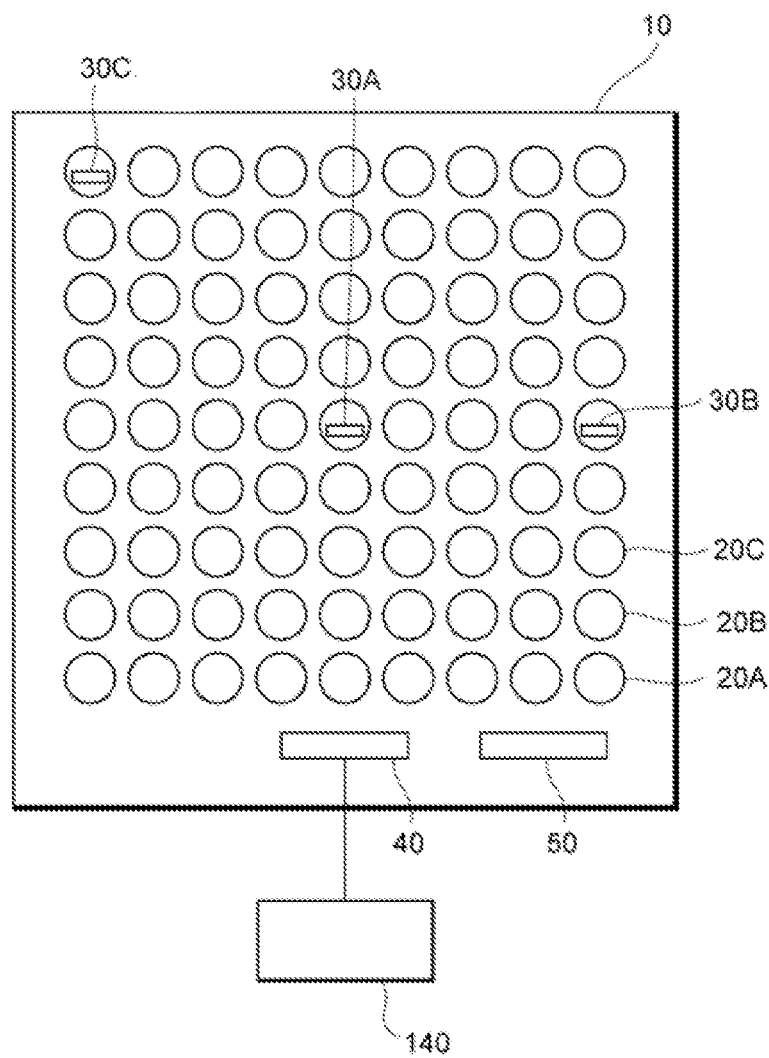
FIG. 1 is a schematic view illustrating a closed-space sensor system according to a first embodiment.

A description will hereinafter be made of embodiments of the invention with reference to the drawings. In the following description of the drawings, the same or similar portions will be denoted by the same or similar reference numerals and symbols. However, the drawings are merely schematic. Thus, specific dimensions and the like should be determined in light of the following description. It is also needless to say that there are portions, the dimensional relationships and proportions of which differ among the drawings.

First Embodiment

As illustrated in FIG. 1, a closed-space sensor system according to a first embodiment has: a power transmitter 40 of an electromagnetic wave irradiator 140 that emits an electromagnetic wave; and a plurality of sensors 30A, 30B, 30C . . . , each of which includes an antenna, converts the electromagnetic wave received via the antenna into electric power, and is thereby driven. In the closed-space sensor system according to the first embodiment, each of the plurality of sensors 30A, 30B, 30C . . . includes a power storage unit, and each of the plurality of sensors 30A, 30B, 30C . . . starts to be driven when a power storage amount in the power storage unit reaches a drive start threshold value that is common to the plurality of sensors 30A, 30B, 30C . . . .

The power transmitter 40 of the electromagnetic wave irradiator 140 includes an antenna, for example. The power transmitter 40 of the electromagnetic wave irradiator 140 may emit the electromagnetic wave in at least one of a plurality of power transmission frequency channels within a power transmission frequency range. In a relationship of reception sensitivity of the antenna to a power transmission frequency, an interval between the power transmission frequency channels may be narrower than an interval between two power transmission frequencies, each of which gives the reception sensitivity of a sensitivity threshold value with which each of the plurality of sensors 30A, 30B, 30C . . . can be driven.

The plurality of sensors 30A, 30B, 30C . . . and the power transmitter 40 of the electromagnetic wave irradiator 140 are arranged in a closed space 10, for example. Portions of the electromagnetic wave irradiator 140 other than the power transmitter 40 may be arranged outside the closed space 10. The closed space 10 is a lyophilizer, for example. For example, when a door is closed, the lyophilizer aseptically shields inside gas from outside air. In the closed space 10, for example, a plurality of vials 20A, 20B, 20C . . . , each of which stores a pharmaceutical product to be lyophilized, are arranged on a shelf. Each of the plurality of sensors 30A, 30B, 30C . . . is arranged in at least some of the plurality of vials 20A, 20B, 20C . . . , for example. The sensors can appropriately be arranged in any of the plurality of vials 20A, 20B, 20C . . . .

An appropriate number of the plurality of sensors 30A, 30B, 30C . . . can be provided. Each of the plurality of sensors 30A, 30B, 30C . . . is a temperature sensor, for example. Each of the plurality of sensors 30A, 30B, 30C . . . is powered wirelessly by the electromagnetic wave, such as a microwave, that is emitted from the power transmitter 40 of the electromagnetic wave irradiator 140, measures a temperature inside the vial that is being lyophilized, and wirelessly emits a sensing signal that includes a measurement result.

Figure 2:
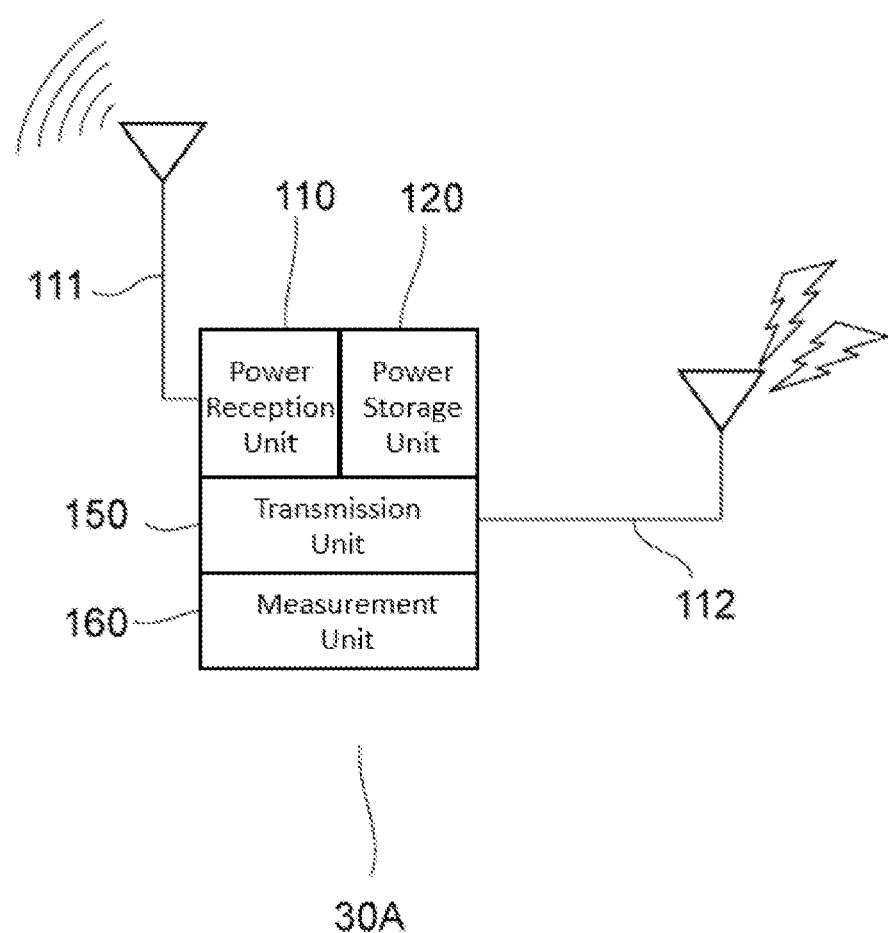
FIG. 2 is a schematic view illustrating a sensor according to the first embodiment.

For example, as illustrated in FIG. 2, the sensor 30A includes: a power reception unit 110 that receives the electric power via the electromagnetic wave; a measurement unit 160 that measures a measurement target such as the temperature; and a transmission unit 150 that can transmit the sensing signal including the measurement result by the measurement unit 160. The power reception unit 110 receives the electromagnetic wave, which is transmitted from the power transmitter 40 of the electromagnetic wave irradiator 140, via a power reception antenna 111. The sensor 30A also includes a power storage unit 120 that stores the electric power received by the power reception unit 110. The power storage unit 120 is electrically connected to the power reception unit 110, the measurement unit 160, and the transmission unit 150. The measurement unit 160 and the transmission unit 150 are driven by the electric power that is stored in the power storage unit 120. The transmission unit 150 wirelessly transmits the sensing signal, which includes the measurement result, via a transmission antenna 112.

The power reception antenna 111 and the transmission antenna 112 may be the same as or differ from each other. Preferably, the power reception antenna 111 can receive the electromagnetic wave in a wide frequency band. Preferably, the transmission antenna 112 can transmit the sensing signal in a wide frequency band. The sensor 30A may include a plurality of power reception antennas 111. The sensor 30A may include a plurality of transmission antennas 112. The other sensors 30B, 30C . . . illustrated in FIG. 1 may also have the same configuration as the sensor 30A illustrated in FIG. 2.

A sensing signal receiver 50 that receives the sensing signal emitted by each of the plurality of sensors 30A, 30B, 30C . . . may be arranged in the closed space 10 illustrated in FIG. 1. The sensing signal receiver 50 includes a reception antenna that receives the sensing signal. Preferably, the reception antenna of the sensing signal receiver 50 can receive the sensing signal in a wide frequency band. The sensing signal receiver 50 may include a plurality of reception antennas. A plurality of sensing signal receivers 50 may be arranged in the closed space 10. The sensing signal receiver 50 may further include a storage device that stores the received sensing signal. Each of the plurality of sensors 30A, 30B, 30C . . . may omit verifying establishment of wireless connection with the sensing signal receiver 50.

There is a case where, when the power transmitter 40 of the electromagnetic wave irradiator 140 emits the electromagnetic wave, the electromagnetic wave is reflected in the closed space 10 and a standing wave is generated. Thus, a null point at which the transmitted electric power is weakened possibly occurs in the vicinity of a node of the standing wave. In the case where a position of the null point matches a position of any of the plurality of sensors 30A, 30B, 30C . . . , the sensor is not possibly powered and operated. In addition, for example, in the case where the closed space 10 is a lyophilizer, a propagation path of the electromagnetic wave in the lyophilizer is possibly changed due to a reduction in an amount of ice in the lyophilizer caused by sublimation, which possibly changes the position of the null point.

To handle the above problem, the electromagnetic wave irradiator 140 can set a combination of the power transmission frequency channels of the electromagnetic wave in which a predetermined number of sensors among the plurality of sensors 30A, 30B, 30C . . . are driven. Before each of the plurality of sensors 30A, 30B, 30C . . . detects a detection target, the electromagnetic wave irradiator 140 changes the power transmission frequency channel of the electromagnetic wave within a settable range, and confirms, for each of the power transmission frequency channels of the electromagnetic wave, whether each of the plurality of sensors 30A, 30B, 30C . . . is driven. Changing the power transmission frequency channel of the electromagnetic wave within the settable range will also sometimes be referred to as sweeping the power transmission frequency of the electromagnetic wave.

The electromagnetic wave irradiator 140 extracts a plurality of power transmission frequency channels of the electromagnetic wave in which at least one of the sensors can be driven. The electromagnetic wave irradiator 140 eliminates power transmission frequency channels of the electromagnetic wave, in which none of the sensors can be driven, from options. Furthermore, the electromagnetic wave irradiator 140 creates a plurality of combinations of the power transmission frequency channels of the electromagnetic wave and the drivable sensors. Moreover, the electromagnetic wave irradiator 140 sets a combination of the power transmission frequency channels of the electromagnetic wave, in which a predetermined number of sensors among the plurality of sensors 30A, 30B, 30C . . . are driven, on the basis of the combinations of the power transmission frequency channel of the electromagnetic wave and the drivable sensor. The predetermined number can be set appropriately according to the detection target of the sensor or the required detection accuracy. The predetermined number may be a total number of the plurality of sensors 30A, 30B, 30C . . . .

The electromagnetic wave irradiator 140 creates a sequence to sequentially emit the electromagnetic wave in the combination of the power transmission frequency channels within a certain period. For example, the certain period is the shortest measurement cycle of measurement cycles of the plurality of sensors 30A, 30B, 30C . . . . In the case where the measurement cycles of the plurality of sensors 30A, 30B, 30C . . . are the same, the measurement cycle of each of the plurality of sensors 30A, 30B, 30C . . . is the shortest measurement cycle. Here, the measurement cycle can be set appropriately according to the detection target of the sensor or the required detection accuracy.

Figure 3:
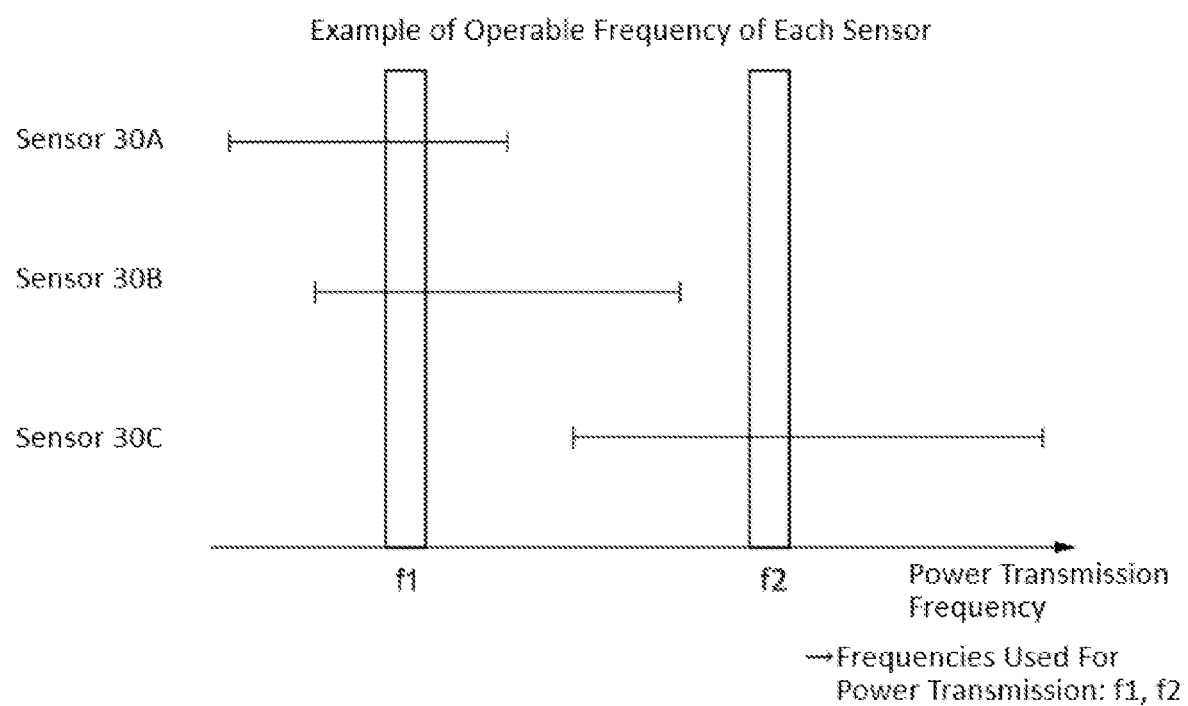
FIG. 3 is a graph illustrating an exemplary relationship between power transmission frequency channels of an electromagnetic wave and drivable sensors according to the first embodiment.

In an example illustrated in FIG. 3, the electromagnetic wave irradiator 140 confirms that the two sensors 30A, 30B are driven in a power transmission frequency channel f1 and that the one sensor 30C is driven in a power transmission frequency channel f2. In this case, the electromagnetic wave irradiator 140 creates a sequence to sequentially emit the electromagnetic wave in the power transmission frequency channel f1 and the electromagnetic wave in the power transmission frequency channel f2 within the shortest measurement cycle of the measurement cycles of the sensors 30A, 30B, 30C.

Figure 4:
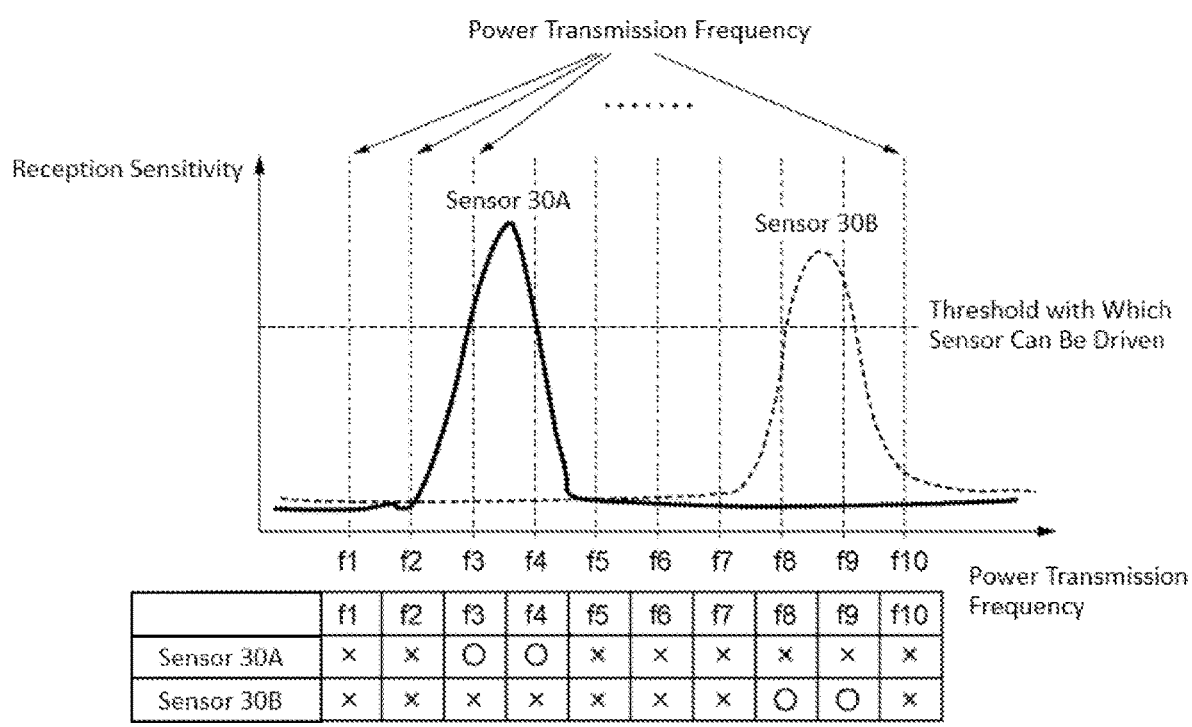
FIG. 4 is a graph illustrating an exemplary relationship between the power transmission frequency channels of the electromagnetic wave and the drivable sensors according to the first embodiment.

In an example illustrated in FIG. 4, the electromagnetic wave irradiator 140 sweeps the power transmission frequency channels f1 to f10, and confirms that the sensor 30A is driven in power transmission frequency channels f3, f4 and that the sensor 30B is driven in power transmission frequency channels f8, f9. In the case where only the two sensors 30A, 30B need to be driven, the electromagnetic wave irradiator 140 creates a sequence to sequentially emit the electromagnetic wave in the power transmission frequency channels f3, f4, f8, f9 within the shortest measurement cycle of the measurement cycles of the sensors 30A, 30B.

According to the created sequence, the electromagnetic wave irradiator 140 illustrated in FIG. 1 repeatedly emits the electromagnetic wave within a certain period by using the set combination of the power transmission frequency channels of the electromagnetic wave. Each of the predetermined number of the sensors 30A, 30B, 30C . . . receives the electromagnetic wave in the power transmission frequency channel, in which the respective sensor can be driven, at least once within the measurement cycle. Accordingly, each of the predetermined number of the sensors 30A, 30B, 30C . . . is driven at least once within the measurement cycle and thus can detect the detection target. The electromagnetic wave irradiator 140 may simultaneously emit the electromagnetic waves in all or at least some of the set combinations of the power transmission frequency channels.

The electromagnetic wave irradiator 140 may reset the combination of the power transmission frequency channels of the electromagnetic wave, in which the predetermined number of sensors among the plurality of sensors 30A, 30B, 30C . . . are driven, while each of the plurality of sensors 30A, 30B, 30C . . . detects the detection target.

For example, in the case where any of the plurality of sensors 30A, 30B, 30C . . . can no longer be driven in the combination of the transmission frequency channels of the electromagnetic wave, which is set at a current time point, the electromagnetic wave irradiator 140 adds the power transmission frequency channel of the electromagnetic wave, in which the sensor that can no longer be driven can be driven, to the currently set combination of the power transmission frequency channels of the electromagnetic wave.

In addition, in the case where the predetermined number of sensors among the plurality of sensors 30A, 30B, 30C . . . can be driven in the added power transmission frequency channel of the electromagnetic wave even when at least one of the power transmission frequency channels is deleted from the currently set combination of the power transmission frequency channels of the electromagnetic wave, the electromagnetic wave irradiator 140 deletes the deletable power transmission frequency channel, and resets the combination of the power transmission frequency channels of the electromagnetic wave to a combination of the added power transmission frequency channel and the combination of the power transmission frequency channels remaining undeleted.

In an example illustrated in FIG. 5(a), a sensor 30E can no longer be driven in the power transmission frequency channel combination f1, f3, f10, in which all of the plurality of sensors 30A, 30B, 30C, 30D, 30E have originally been drivable. In this case, the emission of the electromagnetic wave is stopped in all of the power transmission frequency channels f1, f3, f10. Then, the power transmission frequency channels of the electromagnetic wave are changed within a settable range, so as to reset the combination of the power transmission frequency channels of the electromagnetic wave. As a result, driving of all of the plurality of sensors is temporarily stopped.

Accordingly, as illustrated in FIG. 5(b), instead of stopping the emission of the electromagnetic wave in the power transmission frequency channel combination f1, f3, f10 in which all of the plurality of sensors 30A, 30B, 30C, 30D, 30E have been drivable in the past, the electromagnetic wave irradiator 140 adds the emission of the electromagnetic wave in the power transmission frequency channels f2, f4, for example. The electromagnetic wave irradiator 140 confirms that the sensor 30E can be driven in the power transmission frequency channel f2 of the electromagnetic wave and that the sensor 30E cannot be driven in the power transmission frequency channel f4 of the electromagnetic wave.

Furthermore, as illustrated in FIG. 5(c), in the case where not only the sensor 30E but also the sensor 30D can be driven by the electromagnetic wave in the added power transmission frequency channel f2, all of the plurality of sensors 30A, 30B, 30C, 30D, 30E can be driven even when the power transmission frequency channel f10, in which the sensor 30D can be driven, is deleted from the combination of the power transmission frequency channels that has been set in the past. In this case, the electromagnetic wave irradiator 140 deletes the deletable power transmission frequency channel f10. The electromagnetic wave irradiator 140 resets the combination of the power transmission frequency channels to a combination of the power transmission frequency channel combinations f1, f3, which remain undeleted, and the added power transmission frequency channel f2.

The combination of the power transmission frequency channels of the electromagnetic wave can be reset at appropriate timing. For example, such resetting may be made constantly or may be made periodically on the basis of a timer that is provided to the electromagnetic wave irradiator 140 or a timer that is connected to the electromagnetic wave irradiator 140.

Alternatively, upon confirming that at least some of the plurality of sensors 30A, 30B, 30C . . . are not driven, the electromagnetic wave irradiator 140 may reset the combination of the power transmission frequency channels of the electromagnetic wave. In the case where the electromagnetic wave irradiator 140 confirms that at least some of the plurality of sensors 30A, 30B, 30C . . . are not driven, the electromagnetic wave irradiator 140 may immediately reset the combination of the power transmission frequency channels of the electromagnetic wave, or may reset the combination of the power transmission frequency channels of the electromagnetic wave after a lapse of a predetermined period. Further alternatively, the electromagnetic wave irradiator 140 may reset the combination of the power transmission frequency channels of the electromagnetic wave upon receiving a trigger signal that triggers resetting of the combination of the power transmission frequency channels of the electromagnetic wave.

Additionally, status of electromagnetic wave reception by the antenna of each of the plurality of sensors 30A, 30B, 30C . . . is possibly changed due to a changed position of the power transmitter 40 of the electromagnetic wave irradiator 140, changed arrangement of the plurality of sensors 30A, 30B, 30C . . . , a change in presence or absence of an object present between the power transmitter 40 of the electromagnetic wave irradiator 140 and each of the plurality of sensors 30A, 30B, 30C . . . , or the like, for example.

Figure 6:
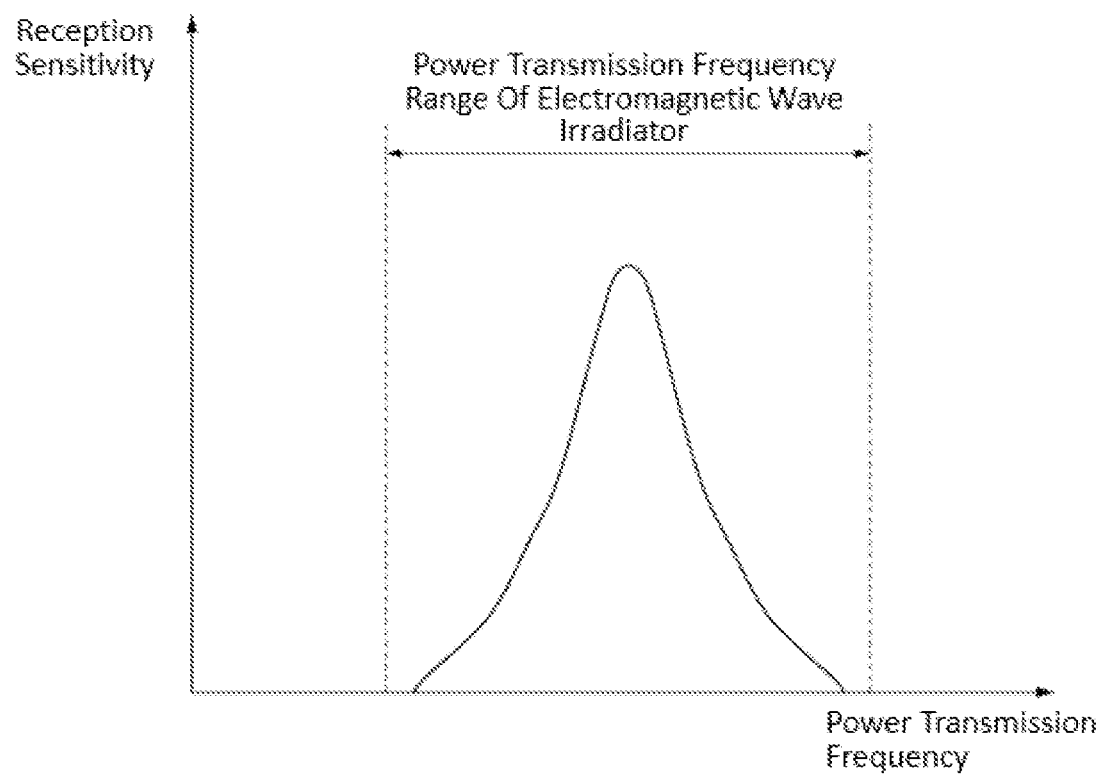
FIG. 6 is a graph schematically illustrating a relationship between a power transmission frequency of the electromagnetic wave and reception sensitivity of the sensor's antenna according to the first embodiment.
Figure 7:
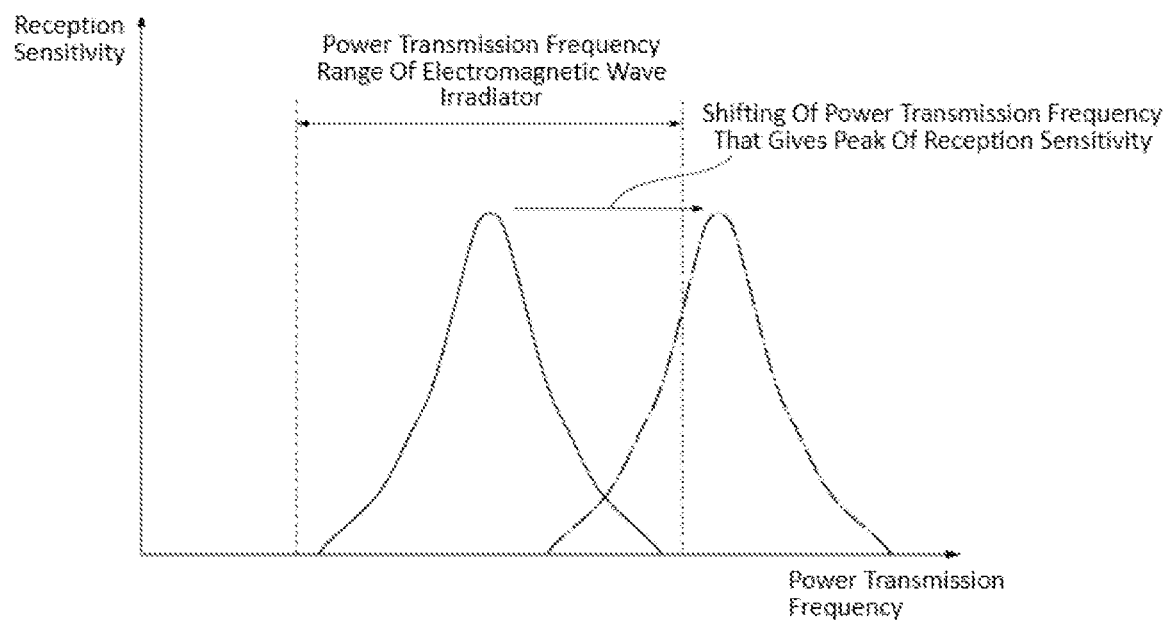
FIG. 7 is a graph schematically illustrating a relationship between the power transmission frequency of the electromagnetic wave and the reception sensitivity of the sensor's antenna according to the first embodiment.
Figure 8:
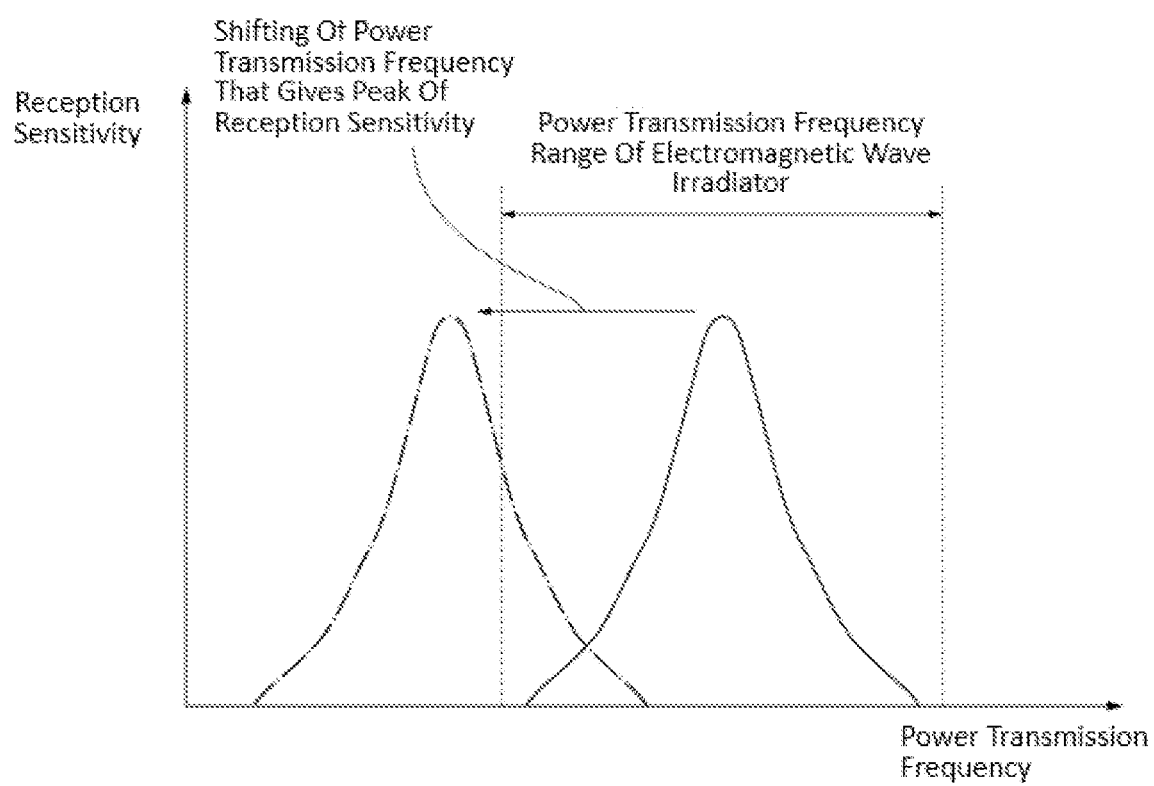
FIG. 8 is a graph schematically illustrating a relationship between the power transmission frequency of the electromagnetic wave and the reception sensitivity of the sensor's antenna according to the first embodiment.

For example, presence of a conductive material such as metal in the vicinity possibly changes the status of electromagnetic wave reception by the antenna of the sensor. As illustrated in FIG. 6, the frequency that gives a peak of the reception sensitivity of the sensor's antenna may be referred to as a resonant frequency. For example, it is assumed that, even if when the sensor's antenna is arranged away from the conductive material, the power transmission frequency that gives the peak of the reception sensitivity of the sensor's antenna falls within the power transmission frequency range where the power transmitter 40 of the electromagnetic wave irradiator 140 can emit the electromagnetic wave, when the sensor's antenna is arranged near the conductive material, as illustrated in FIG. 7 and FIG. 8, the frequency that gives the peak of the reception sensitivity of the sensor's antenna is possibly shifted to the outside of the power transmission frequency range where the power transmitter 40 of the electromagnetic wave irradiator 140 can emit the electromagnetic wave.

Thus, for example, in the case where walls that define the closed space are each made of a conductive material such as metal, the reception sensitivity of the sensor's antenna near the wall possibly differs from the reception sensitivity of the sensor's antenna located away from the wall. For this reason, the reception sensitivity of at least some of the plurality of sensors 30A, 30B, 30C . . . can differ in the closed space.

Figure 9:
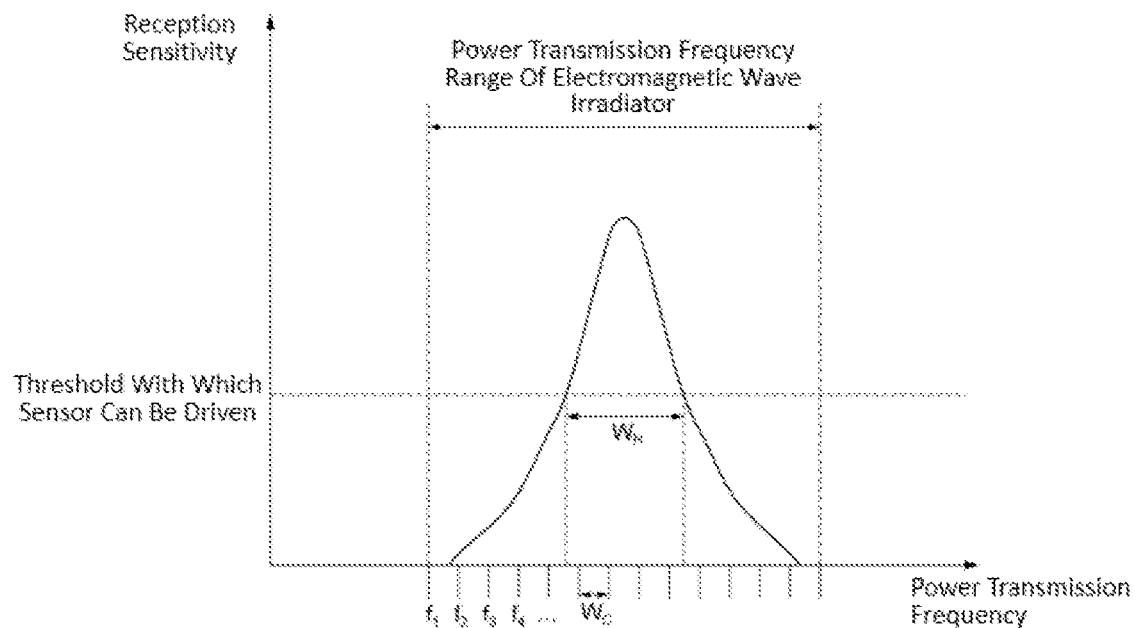
FIG. 9 is a graph schematically illustrating a relationship between the power transmission frequency of the electromagnetic wave and the reception sensitivity of the sensor's antenna according to the first embodiment.

Each of the plurality of sensors 30A, 30B, 30C . . . can be driven by the received electric power when the reception sensitivity of the antenna thereof is equal to or higher than the predetermined sensitivity threshold value. As illustrated in FIG. 9, in a relationship of the reception sensitivity of the antenna to the power transmission frequency, the sensor can be driven when the sensor's antenna receives the electromagnetic wave at the power transmission frequency between two frequencies, each of which gives the reception sensitivity of the sensitivity threshold value with which the sensor can be driven. In the closed-space sensor system according to the first embodiment, in the relationship of the reception sensitivity of the antenna to the power transmission frequency, an interval $W_C$ between adjacent two of the power transmission frequency channels $f_1, f_2, f_3, f_4$ . . . that can be set by the electromagnetic wave irradiator 140 is narrower than an interval $W_E$ between the two frequencies, each of which gives the reception sensitivity of the sensitivity threshold value with which each of the plurality of sensors 30A, 30B, 30C . . . can be driven.

Figure 10:
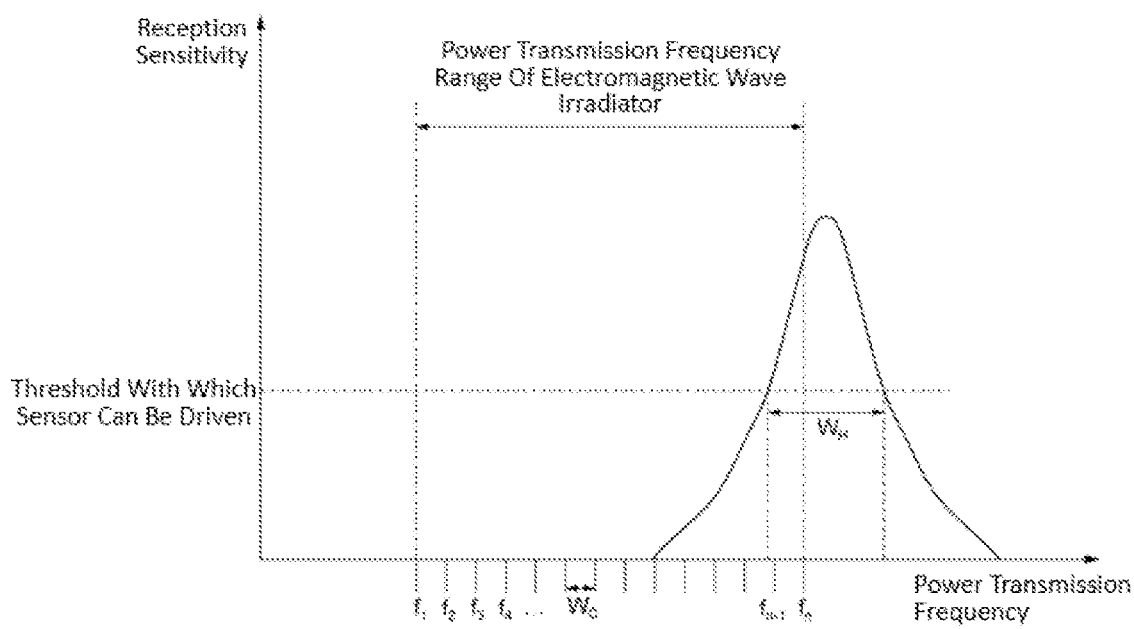
FIG. 10 is a graph schematically illustrating a relationship between the power transmission frequency of the electromagnetic wave and the reception sensitivity of the sensor's antenna according to the first embodiment.

Accordingly, as illustrated in FIG. 10, even in the case where the frequency that gives the peak of the reception sensitivity of the antenna is shifted to the outside of the power transmission frequency range where the power transmitter 40 of the electromagnetic wave irradiator 140 can emit the electromagnetic wave, a power transmission frequency channel $f_n$, that corresponds to the reception sensitivity equal to or higher than the sensitivity threshold value, with which the sensor can be driven, can remain in the interval $W_H$. Therefore, even in the case where the frequency that gives the peak of the reception sensitivity of the antenna is shifted to the outside of the power transmission frequency range where the power transmitter 40 of the electromagnetic wave irradiator 140 can emit the electromagnetic wave, the sensor can be driven by the electromagnetic wave in the power transmission frequency channel, which remains in the interval $W_H$. An appropriate number of power transmission frequency channels can remain in the interval $W_H$.

Figure 11:
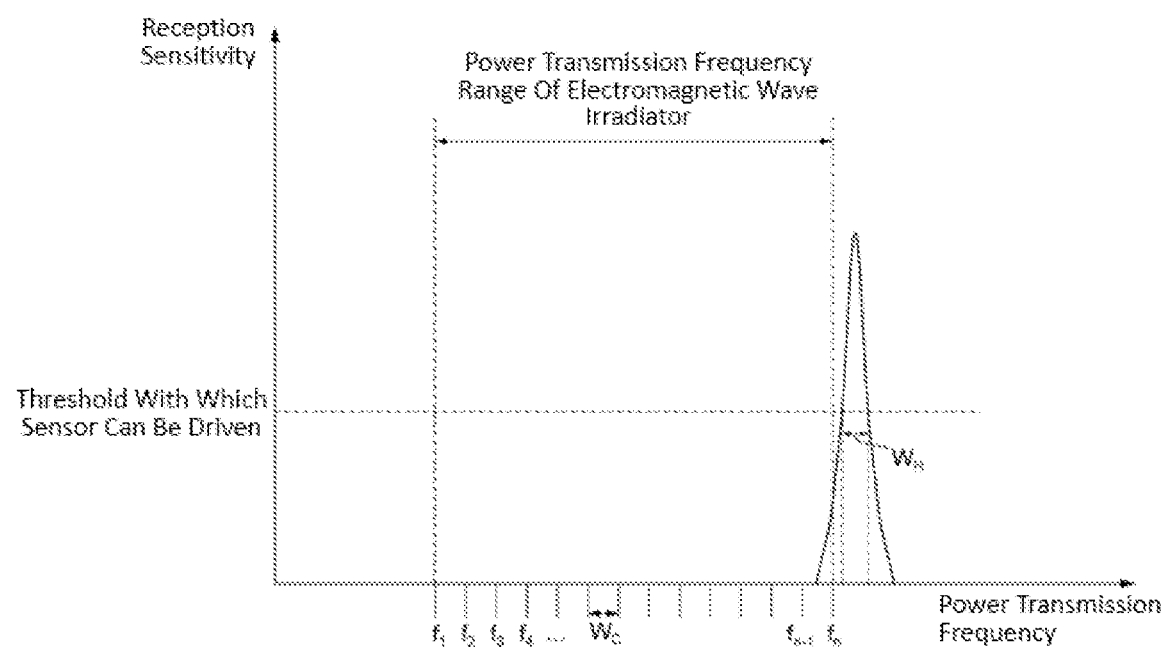
FIG. 11 is a graph schematically illustrating a relationship between the power transmission frequency of the electromagnetic wave and the reception sensitivity of the sensor's antenna according to the first embodiment.

As illustrated in FIG. 11, in the case where the interval $W_H$ between the two power transmission frequencies, each of which gives the reception sensitivity of the sensitivity threshold value with which the sensor can be driven, is narrower than the interval $W_C$ between adjacent two of the power transmission frequency channels $f_1, f_2, f_3, f_4 \ldots$, the power transmission frequency channel that corresponds to the reception sensitivity equal to or higher than the sensitivity threshold value, with which the sensor can be driven, is highly likely to be lost when the peak of the reception sensitivity of the antenna with respect to the power transmission frequency is shifted to the outside of the power transmission frequency range where the electromagnetic wave irradiator can emit the electromagnetic wave.

Meanwhile, as described above, in the closed-space sensor system according to the first embodiment, as illustrated in FIG. 9, in the relationship of the reception sensitivity of the antenna to the power transmission frequency, the interval $W_C$ between adjacent two of the power transmission frequency channels $f_1, f_2, f_3, f_4 \ldots$ is narrower than the interval $W_H$ between the two power transmission frequencies, each of which gives the reception sensitivity of the sensitivity threshold value with which the sensor can be driven. Thus, even when it becomes impossible to drive the sensor in a certain power transmission frequency channel, it is likely that the sensor can be driven in a different power transmission frequency channel. For this reason, in at least some of the plurality of sensors 30A, 30B, 30C . . . in the closed-space sensor system according to the first embodiment, even when the frequency that gives the peak of the reception sensitivity of the antenna is shifted to the outside of the power transmission frequency range of the electromagnetic wave, where the power transmitter 40 of the electromagnetic wave irradiator 140 can emit the electromagnetic wave, it is likely that the measurement can continuously be made. Therefore, there is a wider tolerance for shifting of the frequency, which gives the peak of the reception sensitivity of the antenna, caused by the environment around the sensor.

Figure 12:
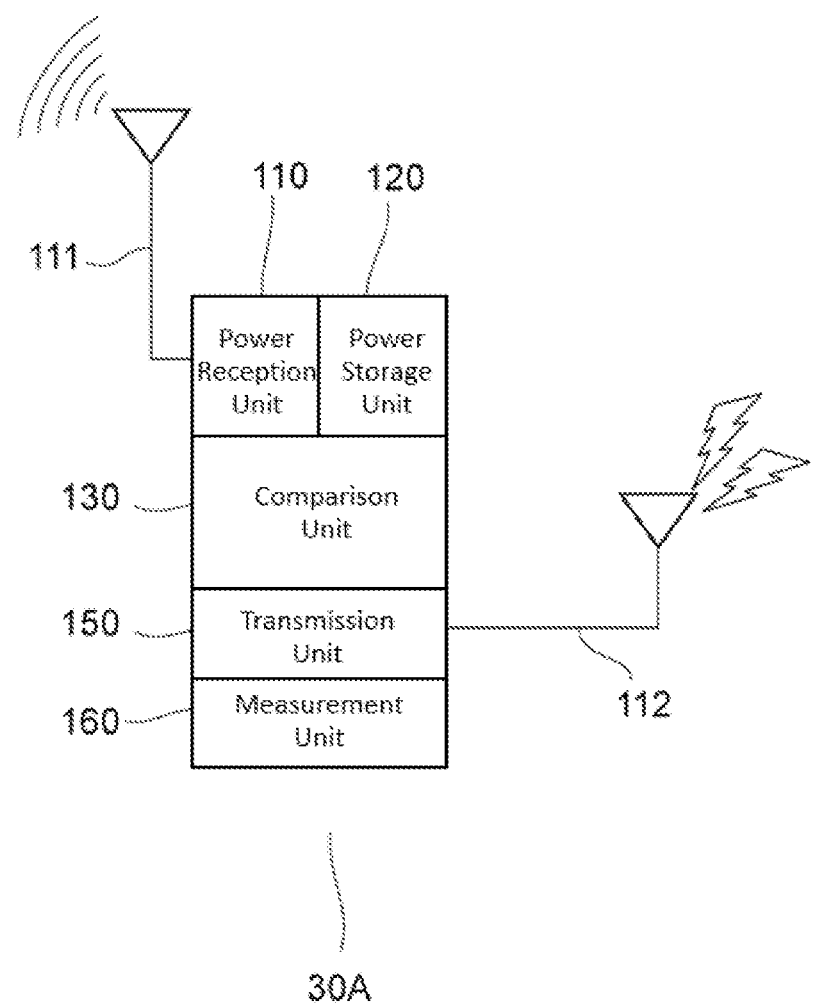
FIG. 12 is a schematic view illustrating a sensor according to the first embodiment.

Each of the plurality of sensors 30A, 30B, 30C . . . illustrated in FIG. 1 may further include a comparison unit 130 illustrated in FIG. 12 that compares the power storage amount of the power storage unit 120 with a drive start threshold value. The drive start threshold value is common to the plurality of sensors 30A, 30B, 30C . . . illustrated in FIG. 1. When the plurality of sensors 30A, 30B, 30C . . . start measuring, the power transmitter 40 of the electromagnetic wave irradiator 140 starts emitting the electromagnetic wave, and the power storage unit 120 of each of the plurality of sensors 30A, 30B, 30C . . . starts being charged. In each of the plurality of sensors 30A, 30B, 30C . . . , in the case where the comparison unit 130 determines that the power storage amount of the power storage unit 120 is equal to or larger than the drive start threshold value, the measurement unit 160 starts measuring the measurement target. Every time the measurement unit 160 measures the measurement target, the transmission unit 150 transmits the sensing signal that includes the measurement result by the measurement unit 160.

Figure 13:
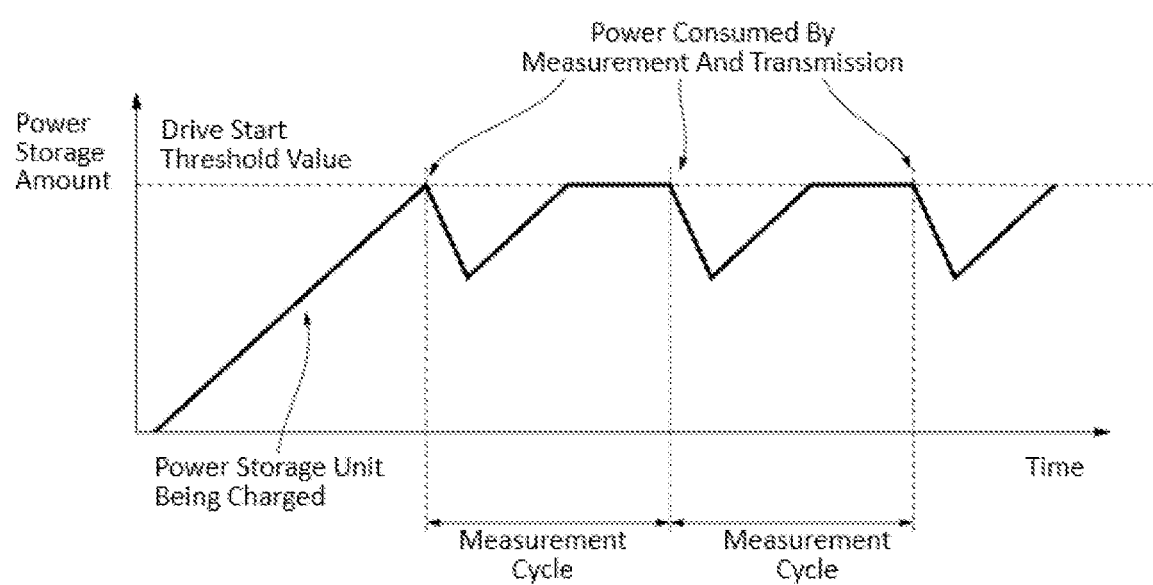
FIG. 13 is a graph schematically illustrating a relationship between time and a power storage amount of the sensor according to the first embodiment.

As illustrated in FIG. 13, the sensor 30A does not start measuring until the power storage amount of the power storage unit 120 becomes equal to or larger than the drive start threshold value. When the power storage amount of the power storage unit 120 becomes equal to or larger than the drive start threshold value, the sensor 30A starts measuring at a predetermined measurement cycle. The same applies to the other sensors 30B, 30C . . . . In the example illustrated in FIG. 13, an example in which the power storage unit 120 is not charged in an amount larger than the drive start threshold value is illustrated. However, the power storage unit 120 may also be charged in an amount larger than the drive start threshold value.

As described above, the reception sensitivity of the antenna of each of the plurality of sensors 30A, 30B, 30C . . . can vary due to the surrounding environment. Thus, the reception sensitivities of the antennas of the plurality of sensors 30A, 30B, 30C . . . can differ from one another. Therefore, a time until the power storage amount in the power storage unit of each of the plurality of sensors 30A, 30B, 30C . . . becomes equal to or larger than the drive start threshold value can also differ among the plurality of sensors 30A, 30B, 30C . . . .

Figure 14A:
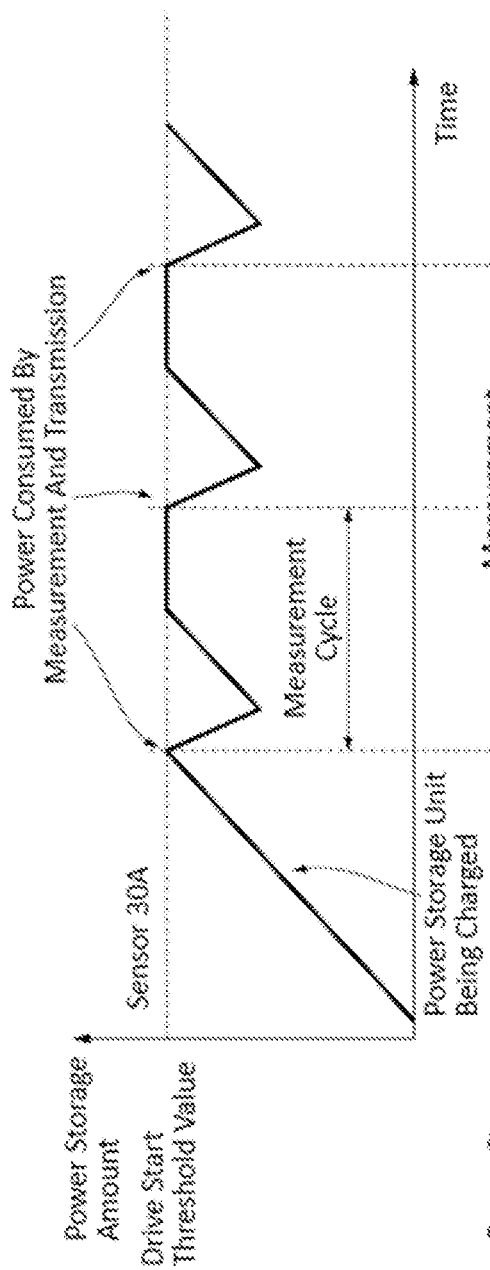
FIG. 14 includes graphs, each of which schematically illustrates the relationship between the time and the power storage amount of the sensor according to the first embodiment.
Figure 14B:
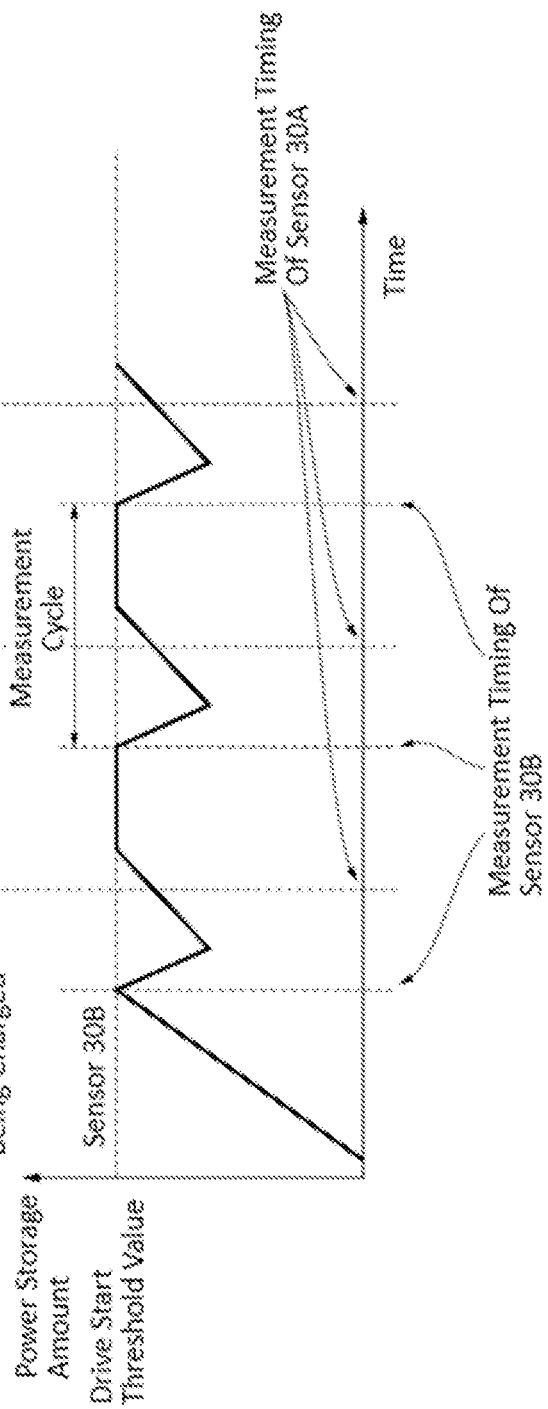

In an example illustrated in FIG. 14, the power storage amount of the power storage unit in the sensor 30B becomes equal to or larger than the drive start threshold value prior to the sensor 30A, and the sensor 30B then starts measuring the measurement target at the predetermined measurement cycle. Thereafter, the power storage amount of the power storage unit in the sensor 30A also becomes equal to or larger than the drive start threshold value, and the sensor 30A then starts measuring the measurement target at the predetermined measurement cycle.

In the case where the measurement cycle of the sensor 30A and the measurement cycle of the sensor 30B are the same, the sensor 30A and the sensor 30B, which have different measurement start points, measure the measurement target and emit the sensing signal, which includes the measurement result, wirelessly at different timing from each other. Thus, the timing at which the sensor 30A emits the sensing signal can differ from the timing at which the sensor 30B emits the sensing signal. Therefore, it becomes possible to avoid interference between the sensing signals and traffic congestion. The same applies to a case where three or more sensors are provided.

Second Embodiment

Figure 15:
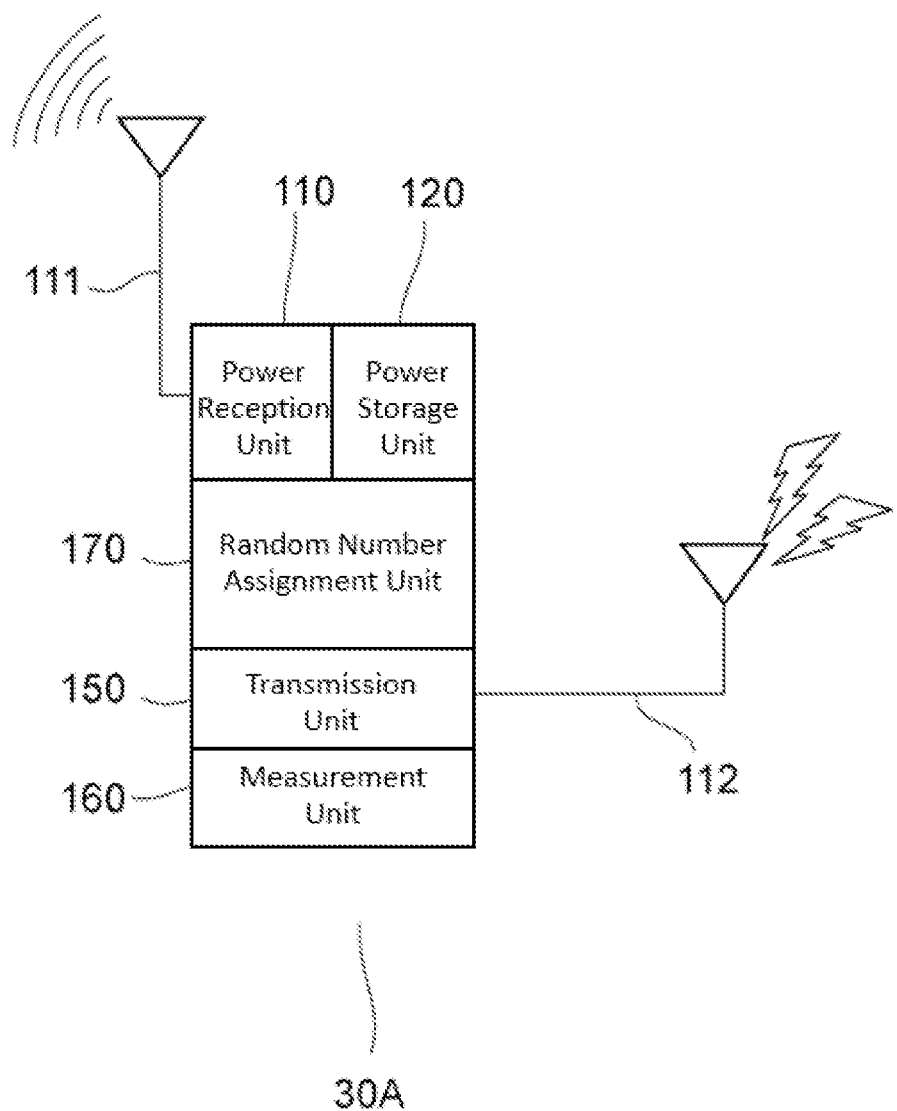
FIG. 15 is a schematic view illustrating a sensor according to a second embodiment.

In each of the plurality of sensors 30A, 30B, 30C . . . illustrated in FIG. 1, the transmission unit 150 illustrated in FIG. 15 may transmit the sensing signal, which includes the measurement result by the measurement unit 160, at a predetermined transmission cycle. In addition, each of the plurality of sensors 30A, 30B, 30C . . . may further include a random number assignment unit 170 that generates a random number and assigns the random number to the sensing signal transmission cycle.

Figure 16:
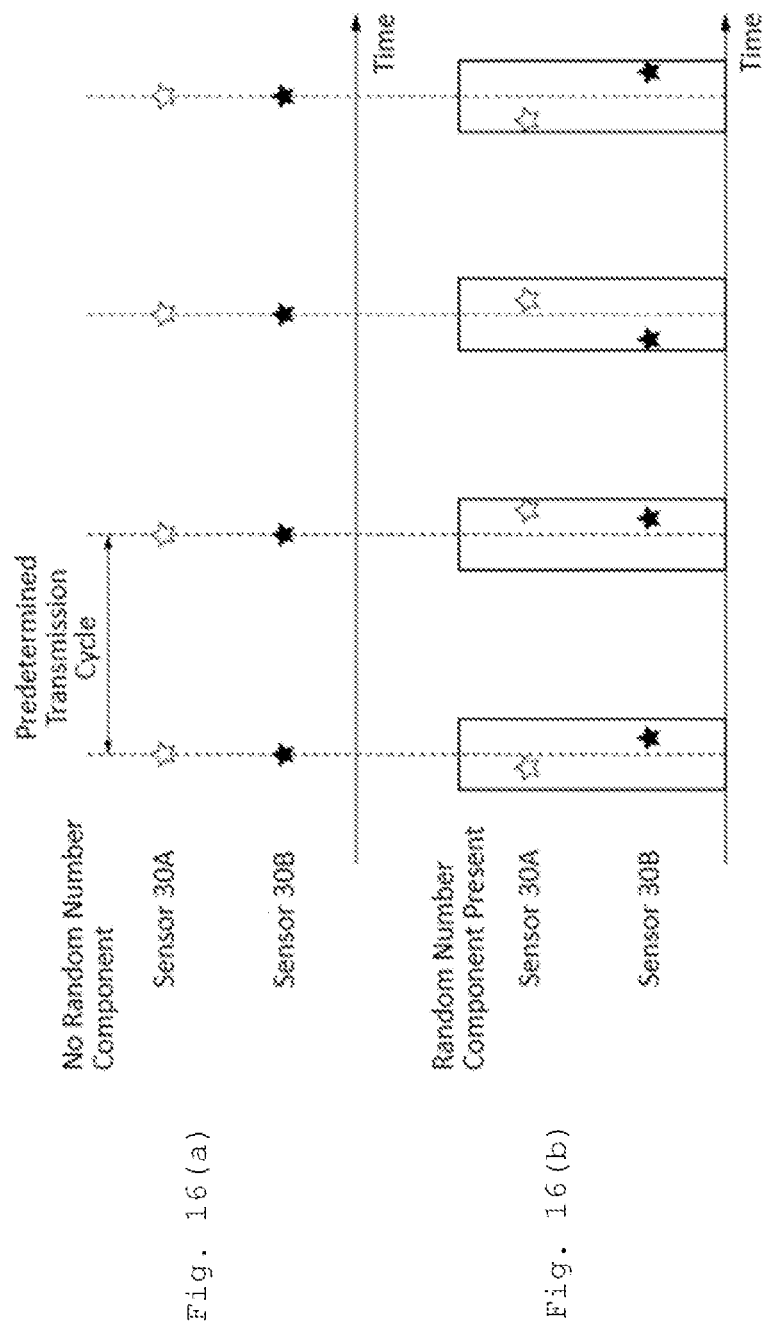
FIG. 16 is a graph schematically illustrating a transmission cycle of a sensing signal according to the second embodiment.

In the case where the transmission cycles of the plurality of sensors 30A, 30B, 30C . . . are the same, as illustrated in FIG. 16(a), the timing at which the plurality of sensors 30A, 30B, 30C . . . transmit the sensing signals can be the same. Meanwhile, in each of the plurality of sensors 30A, 30B, 30C . . . , the random number assignment unit 170 generates either a positive or a negative random number and assigns the generated random number to the transmission cycle. In this way, as illustrated in FIG. 16(b), the timing at which the plurality of sensors 30A, 30B, 30C . . . transmit the sensing signals can differ. Therefore, it becomes possible to avoid interference between sensing signals and traffic congestion.

Third Embodiment

The transmission unit of each of the plurality of sensors 30A, 30B, 30C . . . illustrated in FIG. 1 may change a signal transmission frequency channel of the sensing signal to check whether the sensing signal is received by the sensing signal receiver 50. The transmission unit of each of the plurality of sensors 30A, 30B, 30C . . . may transmit the sensing signal by using the signal transmission frequency channel for which establishment of wireless connection has been confirmed. The transmission unit of each of the plurality of sensors 30A, 30B, 30C . . . may transmit the sensing signal by using a plurality of signal transmission frequency channels for each of which establishment of wireless connection has been confirmed. The transmission unit of each of the plurality of sensors 30A, 30B, 30C . . . may confirm the establishment of the wireless connection before starting the measurement or during the measurement.

Fourth Embodiment

Figure 17:
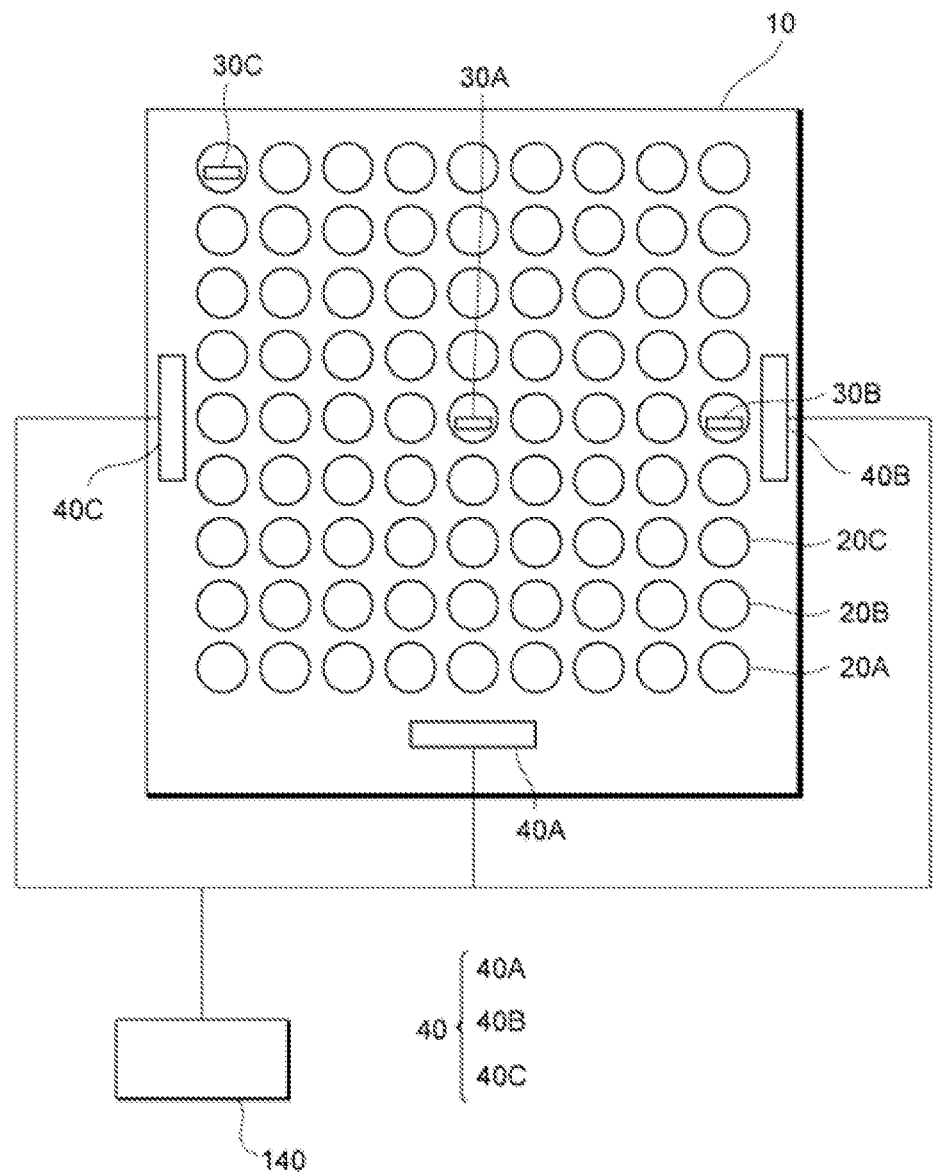
FIG. 17 is a schematic view illustrating a sensor system according to a fourth embodiment.

For example, as illustrated in FIG. 17, in a sensor system according to a fourth embodiment, the power transmitter 40 of the electromagnetic wave irradiator 140 may have a plurality of power transmitters 40A, 40B, 40C, each of which emits an electromagnetic wave, and positions of the power transmitters 40A, 40B, 40C may differ. An appropriate number of the plurality of power transmitters 40A, 40B, 40C can be provided.

The electromagnetic wave irradiator 140 checks whether each of the plurality of sensors 30A, 30B, 30C . . . is driven by respective one of the power transmitters 40A, 40B, 40C. The electromagnetic wave irradiator 140 creates a plurality of combinations of the position of the power transmitter and the sensor that can be driven. Furthermore, the electromagnetic wave irradiator 140 sets the combination of the positions of the power transmitters, where a predetermined number of the sensors among the plurality of sensors 30A, 30B, 30C . . . are driven, on the basis of the combinations of the position of the power transmitter and the sensor that can be driven.

The electromagnetic wave irradiator 140 creates a sequence to emit the electromagnetic waves from the power transmitters at the positions that are included in the set combinations. Alternatively, the electromagnetic wave irradiator 140 may simultaneously emit the electromagnetic waves from all or at least some of the power transmitters at the positions that are included in the set combinations.

The null point is easily affected by a relationship in the position and a direction between each of the power transmitters 40A, 40B, 40C and an inner wall of the closed space 10 or another object that reflects the electromagnetic wave. In addition, there is a case where the inner wall of the closed space 10 cannot be moved. To handle such a problem, by changing the position of the power transmitter that emits the electromagnetic wave, it is possible to change a position of the null point that overlaps the position of the sensor. In this way, the sensor can be driven stably.

Fifth Embodiment

In a sensor system according to a fifth embodiment, as illustrated in FIG. 18, the power transmitter 40 of the electromagnetic wave irradiator 140 includes an antenna that changes an emission direction of the electromagnetic wave. The antenna is a directional antenna, for example. A phased array antenna, a movable parabolic antenna, or the like can be used. The phased array antenna can change directivity without using a movement mechanism, and thus can suppress dust emissions.

The electromagnetic wave irradiator 140 checks whether each of the plurality of sensors 30A, 30B, 30C . . . is driven for each of the emission directions of the electromagnetic wave. The electromagnetic wave irradiator 140 creates a plurality of combinations of the emission direction of the electromagnetic wave and the sensor that can be driven. Furthermore, the electromagnetic wave irradiator 140 sets a combination of the emission directions of the electromagnetic wave, in which a predetermined number of the sensors among the plurality of sensors 30A, 30B, 30C . . . are driven, on the basis of the combinations of the emission direction of the electromagnetic wave and the sensor that can be driven.

The electromagnetic wave irradiator 140 creates a sequence to emit the electromagnetic wave in the emission direction included in the set combination. By changing the emission direction of the electromagnetic wave, it is possible to change the position of the null point that overlaps the position of the sensor. In this way, the sensor can be driven stably.

OTHER EMBODIMENTS

The invention has been described so far by using the embodiments. However, the description and the drawings that constitute a part of the present disclosure should not be understood as limiting the invention. Various alternative embodiments, examples, and operational techniques should be apparent to a person skilled in the art from the present disclosure. For example, the above-described embodiments may be combined. In addition, in the above embodiment, the description has been made on the case where the lyophilizer is used as the closed space. However, the closed space may be a room, a factory, a depository, a cell, a tank, a furnace, or the like. The gas in the closed space may be kept clean. The closed space may be evacuated. The closed space may be a sterile pharmaceutical processing space. In addition, the sensor may set humidity as the measurement target on the basis of a surface acoustic wave. The sensor may set a concentration of gas such as oxygen or carbon dioxide as the measurement target. Alternatively, the sensor may set the presence or absence or movement of each item as the measurement target. The sensor may or may not be placed in any of various containers, not limited to a vial. The sensor may be placed on the items such as a merchandise, an art piece, or a showpiece. Just as described, it should be understood that the invention encompasses various embodiments and the like that are not described herein.

DESCRIPTION OF REFERENCE NUMERALS AND SIGNS

10: closed space, 20: vial, 30: sensor, 40: power transmitter, 50: sensing signal receiver, 110: power reception unit, 111: power reception antenna, 112: transmission antenna, 120: power storage unit, 130: comparison unit, 140: electromagnetic wave irradiator, 150: transmission unit, 160: measurement unit, 170: random number assignment unit

The invention claimed is:

1. A closed-space sensor system comprising:
an electromagnetic wave irradiator including a power transmitter that emits an electromagnetic wave; and
a plurality of sensors, each of which includes an antenna, converts the electromagnetic wave received via the antenna into electric power, and is thereby driven;
wherein
each of the plurality of sensors further includes a power storage unit, and each of the plurality of sensors starts to be driven when a power storage amount in the power storage unit reaches a drive start threshold value that is common to the plurality of sensors,
the power transmitter of the electromagnetic wave irradiator emits the electromagnetic wave in at least one of a plurality of power transmission frequency channels within a power transmission frequency range, and in a relationship of reception sensitivity of the antenna to a power transmission frequency, an interval between the power transmission frequency channels is narrower than an interval between two power transmission frequencies, each of which gives the reception sensitivity of a sensitivity threshold value with which each of the plurality of sensors can be driven.

2. The closed-space sensor system according to claim 1, wherein
the reception sensitivity of at least some of the plurality of sensors differs.

3. The closed-space sensor system according to claim 1, wherein each of the plurality of sensors further includes:
a transmission unit transmitting a sensing signal in at least one of a plurality of signal transmission frequency channels via the antenna.

4. The closed-space sensor system according to claim 3, further comprising:
a plurality of sensing signal receivers for receiving the sensing signal.

5. The closed-space sensor system according to claim 1, wherein
the power transmitter of the electromagnetic wave irradiator and the plurality of sensors are arranged in a closed space.

6. The closed-space sensor system according to claim 1, wherein
a peak of the reception sensitivity of at least some of the plurality of sensors can be positioned outside the power transmission frequency range.

7. The closed-space sensor system according to claim 6, wherein
the electromagnetic wave irradiator sets a combination of the plurality of power transmission frequency channels in which a predetermined number of the sensors among the plurality of sensors can be driven.

8. The closed-space sensor system according to claim 1, wherein each of the plurality of sensors further includes:

a transmission unit that transmits a sensing signal in a transmission cycle via the antenna; and a random number assignment unit that generates a random number and assigns the random number to the transmission cycle.

9. The closed-space sensor system according to claim 1, wherein
the electromagnetic wave irradiator sets a combination of the plurality of power transmission frequency channels in which a predetermined number of the sensors among the plurality of sensors can be driven.

10. The closed-space sensor system according to claim 1, wherein
the power transmitter of the electromagnetic wave irradiator is configured to emit the electromagnetic wave from a plurality of positions.

11. A method for operating a closed-space sensor system, the method comprising:
emitting an electromagnetic wave from a power transmitter of an electromagnetic wave irradiator; and
driving each of a plurality of sensors by converting the electromagnetic wave, which is received via an antenna, into electric power;
wherein
each of the plurality of sensors includes a power storage unit, and each of the plurality of sensors starts to be driven when a power storage amount in the power storage unit reaches a drive start threshold value that is common to the plurality of sensors, the power transmitter of the electromagnetic wave irradiator emits the electromagnetic wave in at least one of a plurality of power transmission frequency channels within a power transmission frequency range, and in a relationship of reception sensitivity of the antenna to a power transmission frequency, an interval between the power transmission frequency channels is narrower than an interval between two power transmission frequencies, each of which gives the reception sensitivity of a sensitivity threshold value with which each of the plurality of sensors can be driven.

* * * * *